United States Patent [19]

Striegl

[11] Patent Number: 4,606,680
[45] Date of Patent: Aug. 19, 1986

[54] REAMER CORE DRILL WITH CUTTING BITS

[76] Inventor: Georg Striegl, List Strasse 25, 7410 Reutlingen, Fed. Rep. of Germany

[21] Appl. No.: 532,275

[22] Filed: Sep. 14, 1983

[30] Foreign Application Priority Data

Sep. 15, 1982 [DE] Fed. Rep. of Germany ....... 3234238

[51] Int. Cl.⁴ .......................... B23B 51/00; B23B 51/06
[52] U.S. Cl. ........................................ 408/156; 408/59; 408/147; 408/161; 408/168; 408/229; 408/233; 408/713; 408/714
[58] Field of Search ................. 408/59, 188, 157, 158, 408/161, 153, 197, 147, 154, 156, 181, 182, 185, 713, 211, 227, 229, 714, 168-170, 180, 187, 198, 224, 233

[56] References Cited

U.S. PATENT DOCUMENTS

| | | | |
|---|---|---|---|
| 270,216 | 1/1883 | French | 408/156 |
| 275,815 | 4/1883 | French | 408/156 |
| 280,368 | 7/1883 | French | 408/182 |
| 2,279,085 | 4/1942 | Winter | 408/156 |
| 3,711,216 | 1/1973 | Zurcher | 408/168 X |
| 3,785,746 | 1/1974 | Wolf et al. | 408/188 X |
| 4,050,840 | 9/1977 | Skingle | 408/161 X |
| 4,428,704 | 1/1984 | Kalokhe | 408/181 X |

FOREIGN PATENT DOCUMENTS

15907  2/1981  Japan ................................ 408/233

*Primary Examiner*—Gil Weidenfeld
*Assistant Examiner*—Steven C. Bishop

[57] ABSTRACT

A device for boring holes has a geometrical longitudinal axis, a clamping zone, a shank having a front end zone, two turnover plates fastened on the front end zone of the shank in opposite positions, and a chip space in front of each turnover plate. In the shank, a longitudinal slot runs radially to the geometrical longitudinal axis, which is open towards the front end zone and has a bottom that extends so far towards the clamping zone that the shank halves thus formed can be bent forward at the front end zone to a degree that is sufficient for fine setting the bore diameter. Beyond the bottom of the longitudinal slot, a tapped hole in the shank is coaxial with the longitudinal axis. A coaxial rest hole in the shank in the inner zone of the longitudinal slot is intersected by the longiudinal slot. A tapered hole is at the outer end of the rest hole, which is complementary to the circumferential surface of a conical screw head, into which tapered hole the head can be screwed for widening the bore diameter, along with the expanding of the longitudinal slot. Transversely to the longitudinal slot and passing through the slot, second and third screws respectively on each side of the geometrical longitudinal axis, allow the longitudinal slot to be narrowed when the screws are tightened.

16 Claims, 7 Drawing Figures

REAMER CORE DRILL WITH CUTTING BITS

The invention relates to a device for core drilling holes, with the cutting properties characteristic of reamers, having a geometrical longitudinal axis and provided with a clamping zone, a shank having a front end zone, two core cutting bits which are fastened in the front end zone of the shank and have cutting edges and are screwed to the shank in opposite positions, and a chip space in front of each core cutting bit. In this specification, reference to a device for boring holes in accordance with this invention means the described device for core drilling, i.e., enlarging existing holes, with the smoothness approximating a reamer. Also, core cutting bits are referred to as turnover plates.

BACKGROUND OF THE INVENTION

If one wants to obtain circular-cylindrical bore holes of the quality IT 7 to 8, then one initially drills the hole by means of a twist drill so that it is undersized. Then one bores the hole with a borer and finally one reams the hole with a reamer to the desired diameter and to the desired quality.

This results, with respect to time, the number of tools required, the control of the machine tool, the price/quality relationship and the possibility of defects occurring, in a very high expenditure and a large number of other obvious disadvantages.

OBJECT AND STATEMENT OF THE INVENTION

It is the object of the invention to indicate a tool which allows fits of the quality IT 7 to IT 8 to be achieved, reaming to be skipped and the diameter to be steplessly adjusted within a range that is wide for precision tools and which has a substantially longer service life than known reamers and borers and which allows high cutting speeds and feed rates to be operated and which results in minimum roundness and cylindricality variations in the holes and which, compared with other borers, gives an at least considerably improved surface quality.

According to the invention, this problem is solved by the following features:

(a) In the shank, a longitudinal slot, is provided radially to the geometrical longitudinal axis, which is open on the edge towards the front end zone and whose bottom extends so far to the clamping zone that the shank halves thus formed can be bent forward on their front end zone to a degree that is sufficient for a diameter fine setting, (b) Beyond the bottom of the longitudinal slot, a tapped hole is provided in the shank so as to be coaxial with the longitudinal axis, (c) A screw is provided having a screw shank partly screwed into the tapped hole and, in the zone where it is not screwed in, lies in a coaxial rest hole, which lies in the inner zone of the longitudinal slot and which is intersected by the longitudinal slot, and which screw has a head with a circumferential surface, which is slightly conical towards the screw shank, coaxially with the longitudinal axis, to which circumferential surface there corresponds a complementary tapered hole at the outer end of the rest hole, into which tapered hole the head can be screwed for widening the diameter, along with the expanding of the longitudinal slot, (d) Transversely to the longitudinal slot and passing through this slot a second screw is provided respectively on either side of the geometrical longitudinal axis, which allows the longitudinal slot to be narrowed when it is tightened, and (e) The two turnover plates are arranged to be in coincidence on the outside, considered in rotation terms, and their boring cutting edge zones are also disposed on the same outside dimension.

Such a tool can be used horizontally, vertically, stationarily or rotationally. It is suitable for machining both holes which are only cored and holes which are only punched. In particular, it is suitable for the production of through holes. The quality remains constant at the through hole inlet and at the through hole outlet. It is suitable for NC operations. Coolant boring presents no problems. The boring allowance spans the wide range of 0.5 to 1.5 mm. One reaches cutting speeds which are 10 to 20 times higher than those attained during reaming. The tool still works very well in boring depths for standard dimensions of 6×diameter. As the high quality of fit indicates indirectly, the service life is also very long, since the tool runs quietly. Compared with the known reamers, it is considerably easier to reset from too large a diameter to a smaller diameter. As turnover plates one can use turnover plates which are obtainable in the market and which, although they are ground, do not require any special grinding. The cutting speeds and feed rates are exactly the same as those of the conventional drills.

Advantageously, the invention includes the following additional features:

A radial cross hole is provided at the bottom of the longitudinal slot whose diameter is several times larger than the width of the longitudinal slot. Due to the features, one ensures that, on the one hand, the longitudinal slot does not exert any notched effect and, on the other hand, one can brace the shank halves against each other sufficiently far by means of relatively small second and third screws.

The longitudinal slot lies, relative to the plane of the turnover plates, between 90° and 50°, preferably in the region of 75°. Due to the features, one ensures that, on the one hand, the chip space is sufficiently large and, on the other hand, the partial shanks carrying the turnover plates remain sufficiently solid and, thirdly, the partial shanks not carrying the turnover plates are sufficiently thin.

The dimension sufficient for the fine setting is in the region of ±0.15 to ±0.05 mm, preferably in the region of ±0.1 mm. A dimensioning like that leads to dimensions which are both capable of being used in practice and of adequate span.

On a M 4×0.5 mm screw the head is 1:10 conical. Due to the features, one ensures, together with the screw pitch, a sufficiently sensitive adaptation and also provides conical friction surfaces which are capable of damping the arising vibrations very well.

Considered in rotation terms, the second and third screws lie in the same direction. Due to the features, one ensures that symmetrical clamping ratios are provided. The features also facilitate the production and the driver necessary for tightening always has to be applied only from the same direction.

The seats of the heads of the second and third screws start out from the chip space. Due to the features, the head sits, because of the design of the chip space, on a part whose cross section is reduced towards the frontal zone, so that the damping of vibrations by friction can be effected in a favourable manner.

The second and third screws lie outside half the diameter of the shank. Due to the features, one attains a high clamping force in view of the conical head of the first screw which bears against the tapered hole.

Considered in rotation terms, the active turnover plate plane lies upstream of the plane, parallel thereto, which passes through the geometrical longitudinal axis. Due to the features, one stabilizes the tool further.

The two turnover plates lie upstream of this plane by the same dimension. Due to the features, any radial urging forces are completely compensated.

The outside dimension is in the region of 19 to 30 mm. In view of the slenderness ratios, weakenings and abilities to vibrate in the shank, friction damping at the various screw heads or their counter surfaces, etc., the device is suitable for such diameter ranges, in particular.

The turnover plates are triangular plates, and their cutting edge zone is respectively the outside corner zone. The features allow in a particularly effective manner, the boring properties to be combined with the fit quality properties.

The turnover plates are coated. One achieves a further improvement in this direction by the features, coating being effected with a coat consisting of a combination of titanium carbide and titanium nitride. For the rest, the turnover plates may have a P quality or K quality. They may have a normal rake angle or else an 0-degree rake angle.

In the case of the shank halves, a first partial shank, which carries the turnover plates and in the cutting direction lies behind and on the same level with the turnover plates, is substantialy larger in cross section than a second partial shank which lies between the chip space and the longitudinal slot. Due to the features, one ensures a favourable division of the cross sections with respect to cutting forces, damping of vibrations, the attachability of screws and screw head seats and total stiffness.

The second and third screws are arranged substantially closer to the front end than to the bottom of the longitudinal slot. Due to the features, one ensures that high clamping forces are attainable even with small screws.

A zone of a face adjoins the longitudinal slot which is set back with respect to the turnover plates. Due to the features, one transfers the tapered hole, and consequently also the head of the first screw, protectively to the inside.

DESCRIPTION OF THE DRAWINGS

The invention will now be described with the aid of a preferred exemplified embodiment. In the drawings:

FIG. 5b shows the lower half of the right-hand zone shown in FIG. 5a.

DETAILED DESCRIPTION

A borer 11 has a clamping zone 12. Above the adjoining annular flange 13, there is provided a coolant hole 14. This hole opens into a central hole 16 which is coaxial with the geometrical longitudinal axis 17. The central hole 16 is shut towards the left in the usual way, which is not shown. Towards the right, it extends to approximately half the length of a shank 18 which is coaxial with the longitudinal axis 17 and from its right-hand end the central hole 16 branches into two diverging distribution holes 19, 21. From the front end, there has been cut into the shank 18 a radial longitudinal slot 22 which is approximately 20 times narrower than the diameter of the shank 18. It extends completely axially and ends inside in a radial, comparatively large cross hole 23. Coaxially with the geometrical longitudinal axis 17 there has been recessed from the front end a through hole 24, whose diameter is larger than the width of the longitudinal slot 22 but whose diameter is smaller than that of the cross hole 23. Further inside the cross hole 23, the through hole 24 merges in a tapped blind hole 26, which is also coaxial with the geometrical longitudinal axis 17 and extends into the shank 18 for a short distance.

At its outer end, the through hole 24, which is not holohedral because of the longitudinal slot 22 intersecting it, merges in a tapered hole 27 which widens towards the outside in the ratio 1:10 and starts relatively far on the inside at 28.

A first screw 29 has such a long threaded shank 31 that, lying in the through hole 24 without contacting it, it can be screwed into the tapped blind hole 26 sufficiently far. During this process, the threaded shank 31 passes through the cross hole 23 without contacting it. At its outer end, the threaded shank 31 has a screw head 32, whose circumferential surface 33 thickens towards the outside in the shape of a circular cone in the ratio of 1:10 and bears against the tapered hole 27.

Diametrically opposite to each other, there are provided in the end zone of the shank 18 chip spaces 36, 37. The distribution hole 19 opens into the chip space 36 and the distribution hole 21 opens into the chip space 37. The chip space 36 is bounded by a first curved surface 38 and by a second flat surface 39. The surface 38 extends at 41 towards the cross hole 23 at approximately 45°, increases continuously in inclination, intersects the distribution hole 19 and, in the upper end zone 42, extends in parallel with the longitudinal slot 22. However, there remains a sufficient distance even at the narrowest point 43 so that sufficient material is provided there without any danger of the tapered hole 27 being deflected when the first screw 29 is tightened.

Figure 1:
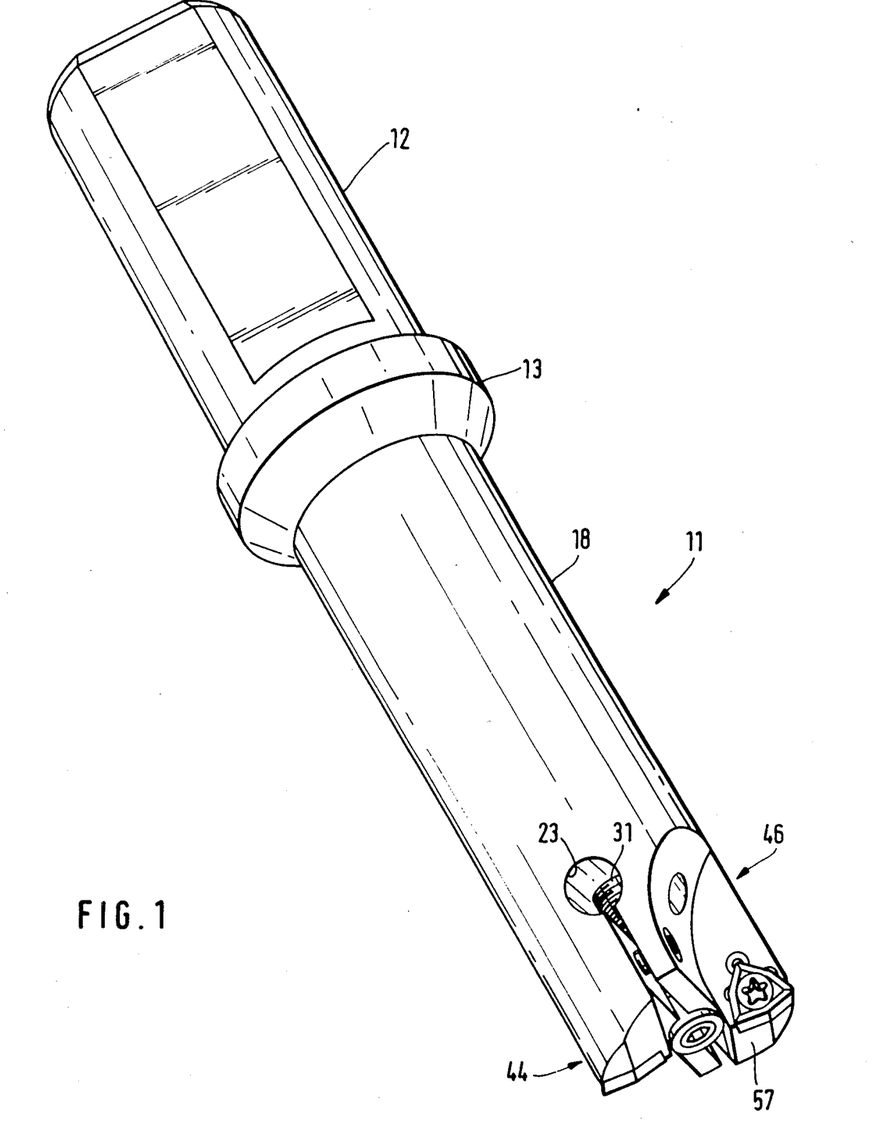
FIG. 1 shows a perspective view of the tool.
Figure 2:
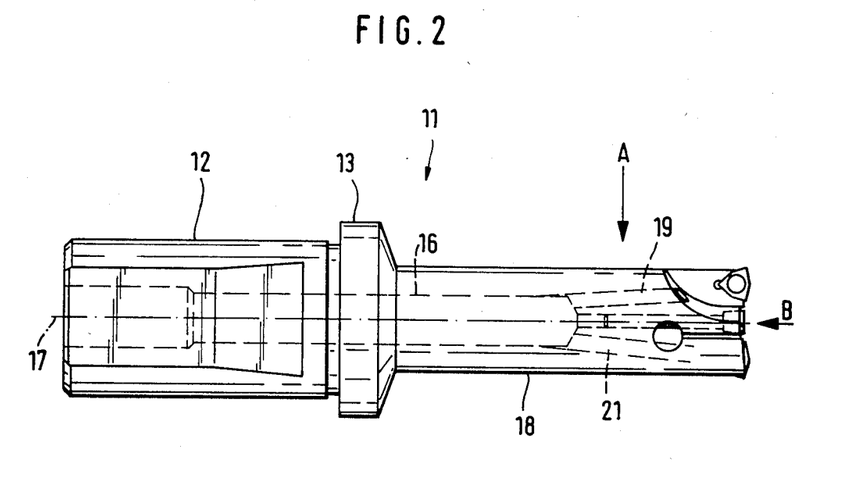
FIG. 2 shows a lateral view of a tool on a scale of 1:1 relative to FIG. 2.
Figure 3:
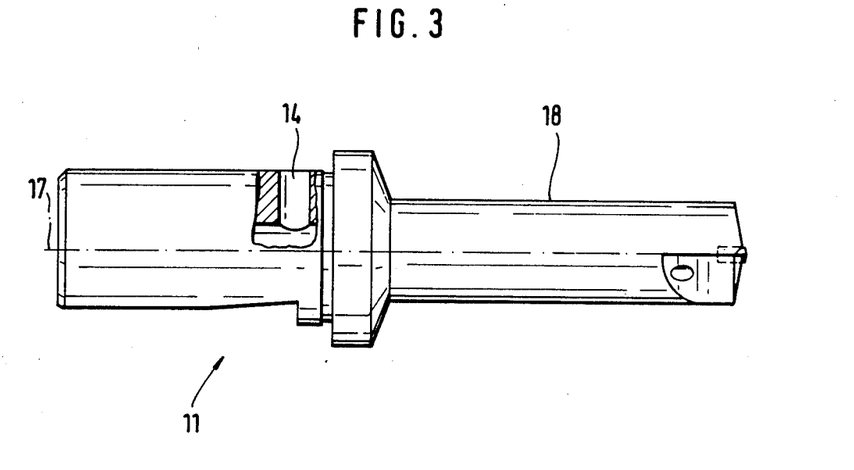
FIG. 3 shows a view according to the arrow A of FIG. 2, also on a scale of 1:1 relative to FIG. 2.
Figure 4A:
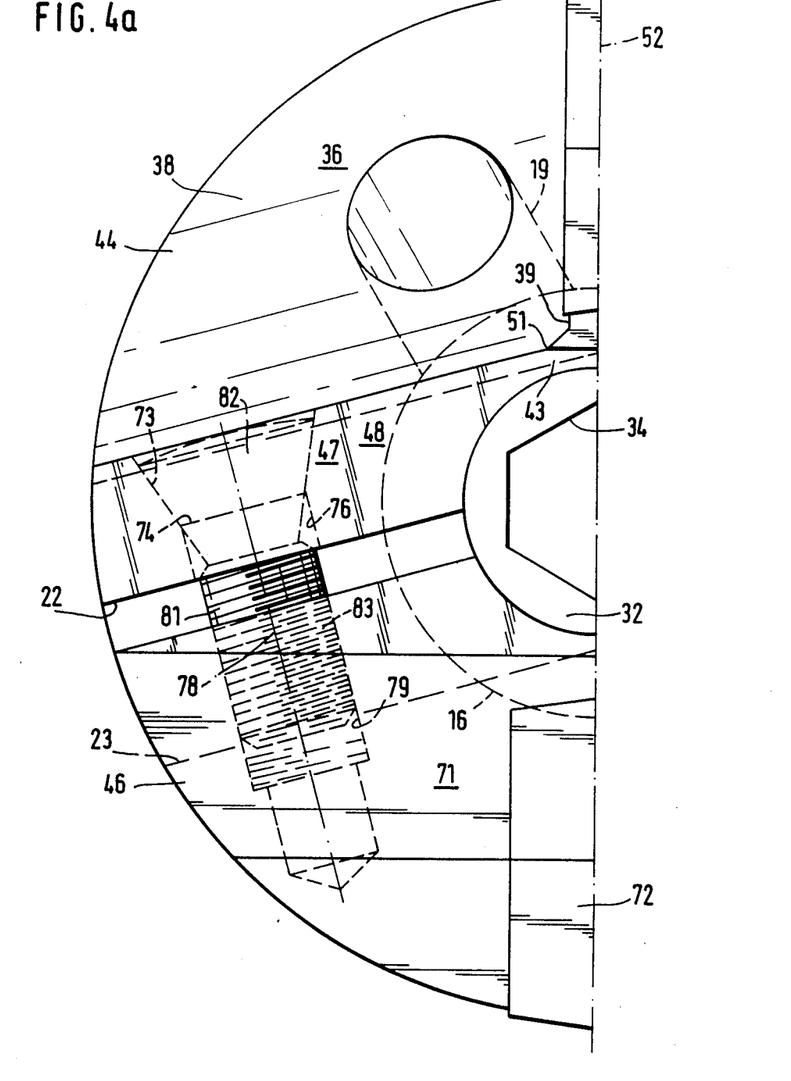
FIG. 4a shows the left half of the front view according to arrow B in FIG. 2.
Figure 4B:
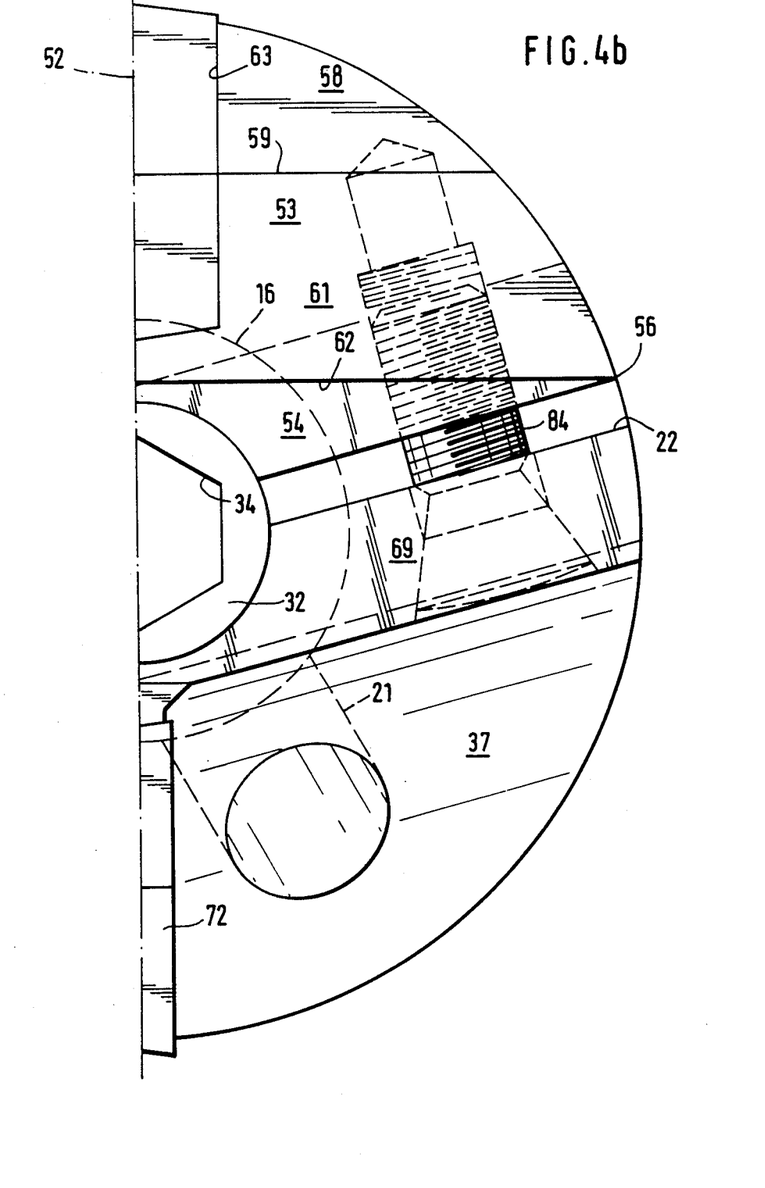
FIG. 4b shows the right half of the front view according to FIG. 2.

With the longitudinal slot 22 providing the shank halves 44 and 46, the curved surface 38 provides a partial shank 47 which becomes thinner towards the front end and ends with a face 48 which is vertical to the longitudinal slot 22 and has the shape to be seen most clearly in FIGS. 4a, 4b. As FIGS. 5a, 5b show, the cross hole 23 also contributes to weaken the partial shank 47 to the desired but not too great extent because of the length 49 of minimum material thickness.

Figure 5A:
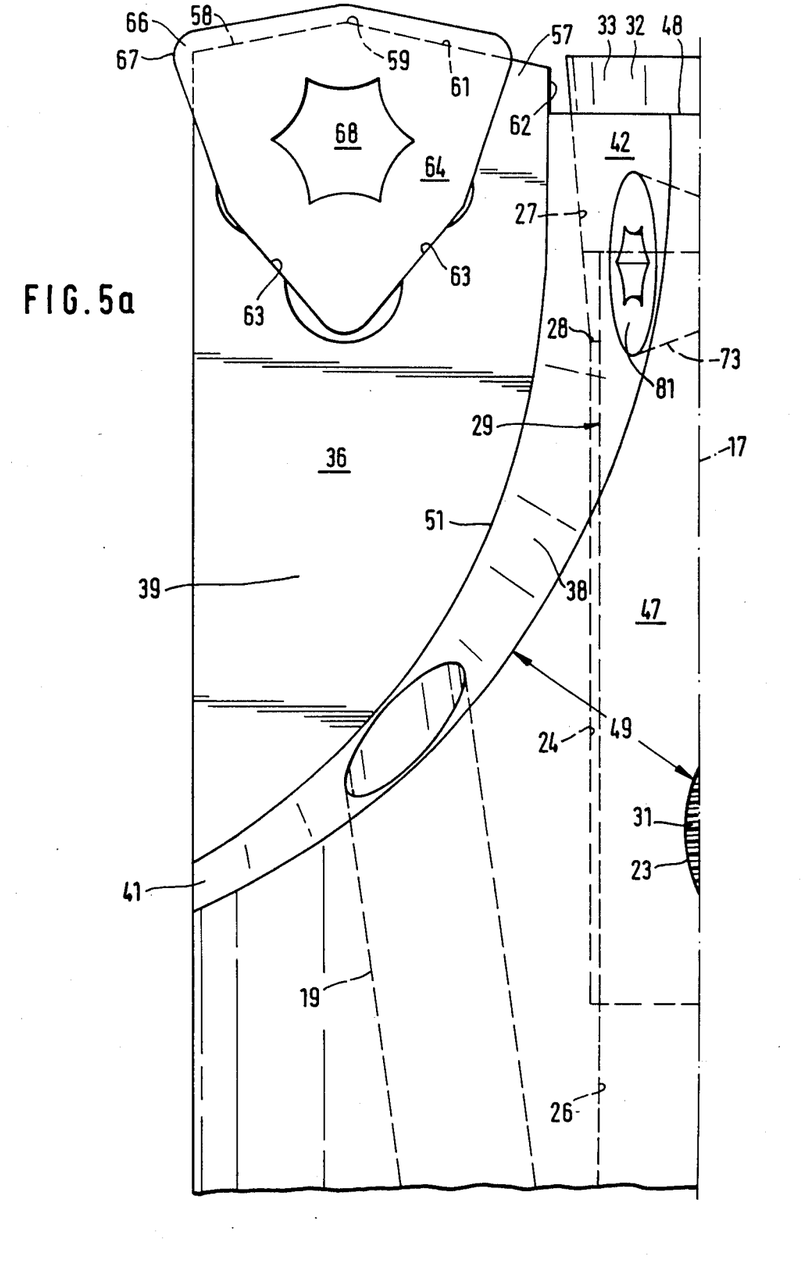
FIG. 5a shows the upper half of the right-hand zone of FIG. 2, broken away, on a scale of 1:10 relative to FIG. 2.
Figure 5B:
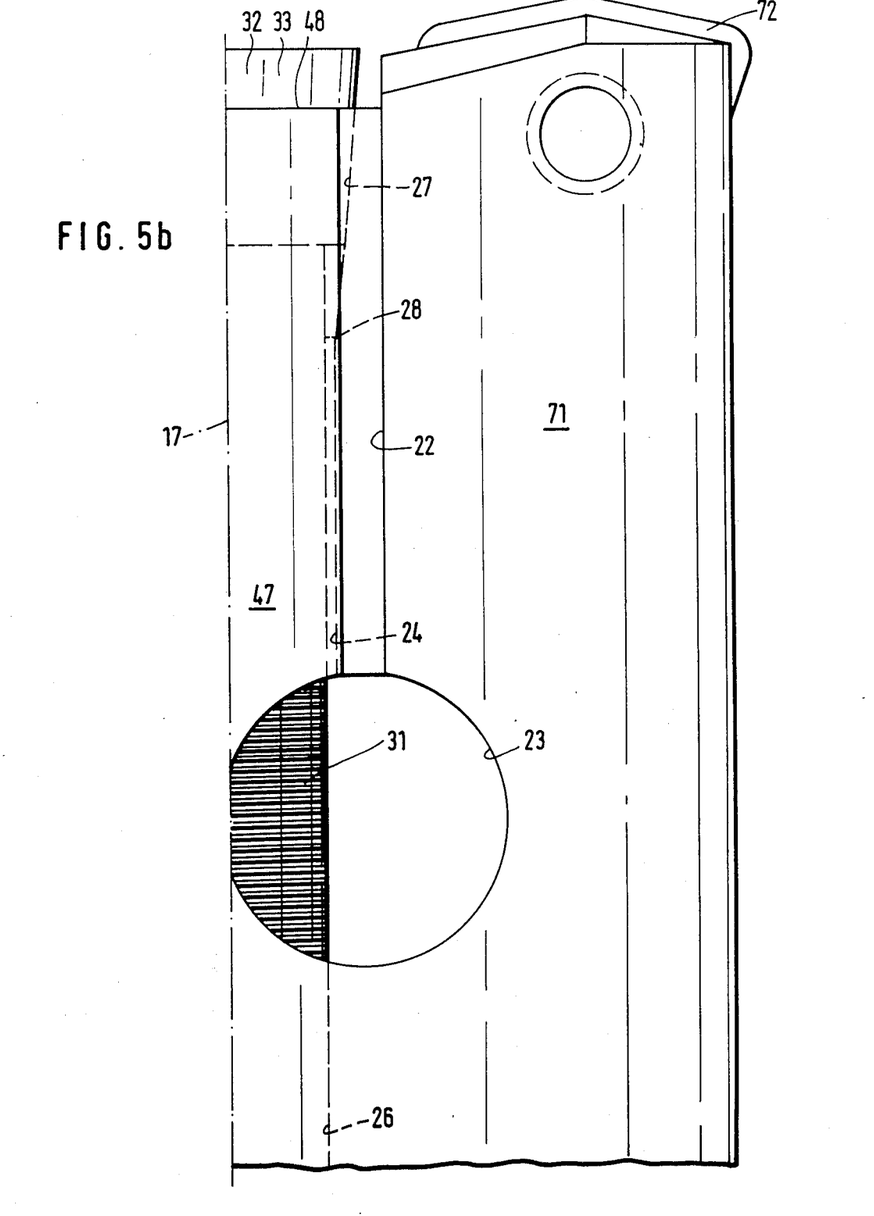

The flat surface 39 encounters in a corner 51, which can be seen particularly clearly in FIGS. 5a, 5b, the curved surface 38. The flat surface 39 is parallel to a diameter plane 52 which passes through the geometrical longitudinal axis 17 but, considered in the direction of cutting, upstream of this diameter plane 52. Together with the longitudinal slot 22, there is thus defined a second partial shank 53 which has a cross section that is substantially larger than that of the partial shank 47, as FIGS. 4a, 4b show. As shown in FIGS. 4a, 4b, the face 48 of the partial shank 47 extends in the shape of a triangular surface 54 from the corner 51 to the right to the point 56, where the point of the triangular surface 54 meets both the circumferential surface of the shank 18 and the outer edge of the longitudinal slot 22. Apart from this triangular surface 48, the partial shank 53 extends higher than the partial shank 47 in the form of a lower projection 57. The projection 57 ends frontally with a smaller outer surface 58 which drops towards the outside and, following a ridge 59, drops towards the triangular surface 54 with an inner surface 61. The inside end of the inner surface 61 then merges in an axially parallel wall 62 which is vertical to the triangular surface 54 and is relatively high at the corner 81 and drops towards the point 56.

On the level of this projection 57 and laterally beside the tapered hole 27 there has been recessed into the flat surface 39 a reception chamber 63 for a turnover plate 64 which has three corner zones, of which the outer corner zone 66 is in the outer active position. All corner zones 66 have the roundness 67, which can be seen in FIGS. 5a, 5b. With this roundness the turnover plate 64 projects to some extent beyond the circumference of the shank 18. As emerges from FIGS. 5a, 5b, the non-active frontal cutting edges of the turnover plate 64 project from the outer surface 58 and the inner surface 61. The turnover plate 64, with its symmetrical line, is parallel to the longitudinal axis 17. The turnover plate 64 itself has the apparent three-side symmetry, so that each of the three corner zones 66 can be used in exactly the same action and the same geometrical position. The turnover plate 64 has been screwed upstream of the second partial shank 53 by a screw 68 which is only indicated.

In an exactly analogous manner, provision has been made for a third partial shank 69 corresponding to the partial shank 47 and for a fourth partial shank 71 corresponding to the second partial shank 53.

At the top and on the outside according to FIGS. 5a and 5b, there has been recessed into the partial shank 47, on the level of the tapered hole 27, from the curved surface 38 a countersunk seat 73 which, following a step 74, continues in a circular-cylindrical through hole 76 which extends to the longitudinal slot 22. Both the countersunk seat and the step 74 and the through hole 76 are coaxial with a geometrical longitudinal axis 78 which, as shown in FIGS. 4a, 4b, is at an angle of 75° to the diameter plane 52. A tapped blind hole 79 has been drilled into the fourth partial shank 71 so as to be coaxial with the longitudinal axis 78.

A screw 81 sits with its conical head 82 in the countersunk seat 73, passes with its shank through the through hole 76 and the longitudinal slot 22 without making contact therewith and is screwed with its threaded shank 83 into the tapped blind hole 79.

Provision has been made under the same conditions for a second screw 84. Since the ratios are symmetrical about the geometrical longitudinal axis 17, there is no need to describe them in detail.

When the borer 11 is set, the screws 81 and 84 are initially loose, and the screw 29 will also not have been screwed in. If one now wants to arrive at a plus diameter, such as +0.1 mm, then one screws the screw 29 in until a measuring instrument indicates a little more than +0.1 mm. Thereupon one tightens the screws 81 and 84 which reduce this dimension very sensitively. The reason for this is the fact that the screw head 32 expands one shank half 44 relative to the other shank half 46 and increases the diameter.

However, the screw 81 pulls the partial shank 71 to some extent towards the partial shank 47, the partial shank 47 being deflected to a greater degree, though, because of its smaller cross section, and this causes the roundness 67 of the turnover plate 72 to be brought again to a somewhat smaller diameter.

The same applies with respect to an operation of the screw 84 in relation to the turnover plate 64.

If one wants to arrive at a diameter of −0.1 mm, then one has to unscrew the screw head 32 and then tighten the screws 81, 84.

I claim:

1. In a reamer-core drill having a longitudinal axis, a diameter which can be fine-set relative to said longitudinal axis, a clamping zone and a shank, said shank having an outer side and a front end zone, two cutting bits, each having a core cutting edge zone, fastened in opposite directions in said front end zone, and a chip space in front of each of said cutting bits, the improvement wherein, said shank has a longitudinal slot oriented radially with respect to said geometrical longitudinal axis which divides said shank into shank halves, said longitudinal slot having one end which opens at said front end zone and an opposite end which extends inwards into said shank towards said clamping zone a distance adequate to enable said shank halves to bend at said front end zone to a degree adequate to permit fine setting of said diameter of said core-reamer drill, each of said shank halves has a first shank half portion and a second shank half portion having a cross section that is substantially smaller than said first half portion, each of said first shank half portions has one of said two cutting bits secured thereto and lays behind and at about the same level as said cutting bit, each of said second shank half portions lays between one of said chip spaces and said longitudinal slot, coaxial with said longitudinal axis, said shank has a tapped hole that extends at one end further inwards into said shank towards said clamping zone than said longitudinal slot, and a rest hole that extends at one end outwards towards said front end zone, a first screw has a screw shank with a first screw shank portion engaged in said tapped hole, a second screw shank portion passing through said rest hole, and a screw head with a slightly conical circumferential surface which tapers toward said screw shank coaxially with said longitudinal axis, said shank has a tapered hole at said outward end of said rest hole which is complementary with said circumferential surface of said screw head into which said screw head can be inserted to expand said longitudinal slot and widen said diameter of said reamer-core drill, second and third screws pass transversely through said longitudinal slot on each side of said geometrical longitudinal axis substantially closer to said open end than said inward end of said longitudinal slot, which narrows said longitudinal slot when said second and third screws are tightened, and said shank has said two cutting bits arranged thereon with said cutting edges of said cutting bits disposed rotationally coincident at said outer side of said shank.

2. A drill as claimed in claim 1, wherein said shank has a radial cross hole at the inward end of said longitudinal slot having a diameter several times larger than the width of said longitudinal slot.

3. A drill as claimed in claim 1, wherein said two cutting bits are in a plane and said longitudinal slot lies at an angle within a range of between 90° and 50° relative to said plane of said two cutting bits.

4. A drill as claimed in claim 3, wherein said longitudinal slot lies at an angle in the range of about 75°.

5. A drill as claimed in claim 1, wherein fine setting of said drill is in the range of ±0.15 to ±0.05 mm.

6. A drill as claimed in claim 5 wherein the fine setting of said drill is in the range of ±0.05 mm.

7. A drill as claimed in claim 1, wherein said first screw is an M 4×0.5 mm. screw having a screw head that is 1:10 conical.

8. A drill as claimed in claim 1, wherein said second and third screws are arranged in the same rotational direction.

9. A drill as claimed in claim 1, wherein said shank has head seats for said second and third screws commencing in said chip spaces.

10. A drill as claimed in claim 1, wherein said second and third screws lie outside half the diameter of said shank.

11. A drill as claimed in claim 1, wherein each of said two cutting bits lie in a plane that is rotationally upstream and parallel to a plane which passes through said geometrical longitudinal axis.

12. A drill as claimed in claim 11, wherein said two cutting bits lie upstream to the same extent.

13. A drill as claimed in claim 1, wherein said outer side of said shank is in the range of 19 to 30 mm. in diameter.

14. A drill as claimed in claim 1, wherein said two cutting bits are triangular plates, each having an outside corner zone comprising said core cutting edge zone.

15. A drill as claimed in claim 1, comprising a coating on said two cutting bits.

16. A drill as claimed in claim 1, wherein said shank has a face at said front end zone which adjoins said longitudinal slot and is set back with respect to said two cutting bits.

* * * * *